(12) United States Patent
Del Gaudio et al.

(10) Patent No.: US 11,603,489 B2
(45) Date of Patent: Mar. 14, 2023

(54) METHOD FOR INHIBITING WATER PERMEATION IN AN EXTRACTION WELL OF A HYDROCARBON OIL FROM AN UNDERGROUND RESERVOIR

(71) Applicant: ENI S.P.A., Rome (IT)

(72) Inventors: Lucilla Del Gaudio, San Donato Milanese (IT); Davide Moscatelli, Arese (IT); Paola Albonico, Milan (IT)

(73) Assignee: ENI S.P.A., Rome (IT)

( * ) Notice: Subject to any disclaimer, the term of this patent is extended or adjusted under 35 U.S.C. 154(b) by 24 days.

(21) Appl. No.: 17/246,746

(22) Filed: May 3, 2021

(65) Prior Publication Data

US 2021/0253935 A1 Aug. 19, 2021

Related U.S. Application Data

(62) Division of application No. 16/326,623, filed as application No. PCT/IB2017/055061 on Aug. 22, 2017, now Pat. No. 11,034,882.

(30) Foreign Application Priority Data

Aug. 23, 2016 (IT) .......................... 102016000086697

(51) Int. Cl.
| | |
|---|---|
| *C09K 8/512* | (2006.01) |
| *C08F 220/28* | (2006.01) |
| *C08F 220/06* | (2006.01) |
| *C09K 8/58* | (2006.01) |
| *E21B 33/138* | (2006.01) |
| *C09K 107/00* | (2006.01) |

(52) U.S. Cl.
CPC ............ *C09K 8/512* (2013.01); *C08F 220/06* (2013.01); *C08F 220/286* (2020.02); *C09K 8/58* (2013.01); *E21B 33/138* (2013.01); *C09K 2107/00* (2013.01)

(58) Field of Classification Search
None
See application file for complete search history.

(56) References Cited

U.S. PATENT DOCUMENTS

| | | | |
|---|---|---|---|
| 3,865,772 A * | 2/1975 | Hulyalkar | ................ C08F 2/02 526/86 |
| 4,644,020 A | 2/1987 | Stahl | |
| 5,335,726 A | 8/1994 | Rodrigues | |
| 2004/0171495 A1 | 9/2004 | Zamora et al. | |
| 2005/0178549 A1 | 8/2005 | Eoff et al. | |
| 2011/0048718 A1 | 3/2011 | Van Zanten et al. | |
| 2012/0298354 A1 | 11/2012 | Sullivan et al. | |
| 2013/0312967 A1 | 11/2013 | De Ghetto et al. | |
| 2014/0224492 A1 | 8/2014 | Weaver et al. | |
| 2014/0378617 A1 | 12/2014 | Wilson et al. | |
| 2018/0134887 A1 | 5/2018 | Del Gaudio et al. | |

FOREIGN PATENT DOCUMENTS

| | | |
|---|---|---|
| CN | 103205247 A | 7/2013 |
| CN | 103923629 A | 7/2014 |
| WO | WO 2004/076811 A2 | 9/2004 |
| WO | WO 2012/090153 A1 | 7/2012 |
| WO | WO 2012/159008 A2 | 11/2012 |
| WO | WO 2014/126805 A1 | 8/2014 |

OTHER PUBLICATIONS

International Search Report dated Nov. 14, 2017 in PCT/IB2017/055061 filed Aug. 22, 2017.

Combined Chinese Office Action and Search Report dated Sep. 9, 2020, in Patent Application No. 201780051253.3 (with English translation), 22 pages.

* cited by examiner

*Primary Examiner* — Andrew Sue-Ako

(74) *Attorney, Agent, or Firm* — Oblon, McClelland, Maier & Neustadt, L.L.P.

(57) ABSTRACT

The present invention relates to a composition for inhibiting water permeation in an extraction well of a hydrocarbon oil from an underground reservoir which comprises injecting into said reservoir at least one polymerizable composition comprising:
- at least one hydrophilic monomer,
- at least one hydrophilic initiator of radical polymerization with thermal activation (hydrophilic initiator),
- at least one lipophilic initiator of radical polymerization with thermal activation (lipophilic initiator).

The present invention also relates to the polymerizable compositions that can be used in said method.

15 Claims, No Drawings

METHOD FOR INHIBITING WATER PERMEATION IN AN EXTRACTION WELL OF A HYDROCARBON OIL FROM AN UNDERGROUND RESERVOIR

CROSS REFERENCE TO RELATED APPLICATIONS

This application is a divisional application of prior U.S. application Ser. No. 16/326,623, filed Feb. 19, 2019, the disclosure of which is incorporated herein by reference in its entirety. U.S. application Ser. No. 16/326,623 is the National stage of PCT/IB2017/055061 filed Aug. 22, 2017, the disclosure of which is incorporated herein by reference in its entirety. U.S. application Ser. No. 16/326,623 claims priority to Italian Application No. 102016000086697, filed Aug. 23, 2016, the disclosure of which is incorporated herein by reference in its entirety.

The present invention relates to a method for inhibiting the permeation of water in an extraction well of a hydrocarbon oil from an underground reservoir.

In particular, the present invention relates to a method for inhibiting the permeation of water in an extraction well of a hydrocarbon oil from an underground reservoir which comprises injecting into the reservoir, a polymerizable composition capable of forming a polymeric material in situ, which is able to block or at least slow down the permeation of reservoir water in the extraction well.

The polymerizable composition is formulated so that the formation of the polymer takes place selectively in the areas of the reservoir in which water is present, so as not to negatively alter the mobility of the hydrocarbon oil and therefore the capacity of recovering the oil through the extraction well.

In a preferred embodiment, the polymer formed is a hydrogel which absorbs the reservoir water with which it enters into contact, immobilizing it in the area of the reservoir in which this is present.

For the purposes of the present invention, the expression "hydrocarbon oil" refers to a liquid containing hydrocarbons or prevalently hydrocarbons, having a natural origin, present in an underground or underwater rock formation. The hydrocarbon oil can possibly contain water in a dispersed or emulsified form. The terms "hydrocarbon oil" and "oil" are used alternately in the following description.

For the purposes of the present invention, the expression "irreducible water" refers to the fraction of water present in the pores of a rock formation containing a hydrocarbon fluid or in the spaces between the rock granules that constitute said formation; the irreducible water, withheld in the formation mainly due to surface tension forces, is not substantially removed during the extraction of the fluid from the formation.

For the purposes of the present invention, the expression "reservoir water" refers to the fraction of water present in a rock formation containing a hydrocarbon fluid which can be removed during the extraction of the fluid from the formation. Reservoir water can be formed, for example, by the infiltration of water from an aquifer situated close to the reservoir or by injections of water or steam into the subsoil, effected for displacing the fluid towards the extraction well.

The presence of water associated with a hydrocarbon fluid (e.g. hydrocarbon oil or natural gas) extracted from an underground reservoir represents a problem having a major economic impact in the oil extraction field.

The extraction of a hydrocarbon fluid mixed with water reduces the extraction efficiency of the fluid itself, it increases the costs and dimensions of the equipment necessary for separating the water, it increases the overall extraction costs of the fluid and, finally, it creates the problem of disposing of the water separated, which is contaminated by hydrocarbons.

The extraction of water together with hydrocarbon fluid from an oil well, in addition to involving frequent interruptions of the extraction operations for allowing the implementation of measures for curbing water permeation, in some cases may be of such an entity as to cause the early closure of the well, thus preventing the complete exploitation of the oil reservoir (for example, when the oil reservoir is close to an aquifer).

Various techniques are known in the state of the art, for reducing water extraction from an oil well. One of these techniques involves the injection, into the rock formation of the reservoir, of chemical compounds, such as polymers, gels and foams, capable of forming a mechanical barrier impermeable to water, blocking the preferential water paths in the rock formation towards the extraction well. The mechanical barrier can be obtained by reacting in situ two or more reagents, injected separately, which form a barrier compound.

U.S. Pat. No. 3,965,986, for example, describes a method for increasing the productivity of an oil well based on the reduction in the water permeability of selected layers of the rock formation of a reservoir. The reduction in the water permeability of a certain layer of the rock formation is obtained through a first injection of an aqueous dispersion of colloidal silica into the layer, followed by a second injection of an aqueous solution containing a surfactant. The contact of the aqueous solution containing the surfactant with the colloidal silica leads to the formation of a gel (barrier compound) which blocks the pores of the rock formation of the layer, reducing the permeability of the layer to water.

WO 2012/090153 describes a method for reducing water coning and gas coning phenomena in an extraction well of a hydrocarbon fluid from an underground reservoir situated close to an aquifer or hood gas.

The method comprises the injection, into the aquifer (or hood gas), of a treatment fluid—containing an active principle—having an intermediate density between that of the hydrocarbon fluid to be extracted and the water (or hood gas). Due to the different density, the treatment fluid migrates spontaneously as far as the contact interface between the hydrocarbon fluid and the water (or hood gas). The active principle contained in the fluid is activated in situ, forming, at the contact interface, compounds capable of forming a water-impermeable barrier.

In an embodiment, the method described in WO 2012/090153 involves the injection of a first treatment fluid containing a monomer (e.g. amide, acrylamide, ethylene glycol) and a pre-polymer (polyamide, polyacrylamide, polyethyleneglycol) as active principle. A second treatment fluid containing a polymerization initiator is then injected into the same point of the reservoir to trigger the polymerization of the monomer or pre-polymer (activation in situ) and form a water-impermeable barrier compound.

The polymerization initiators used for the formation in situ of polymers are typically radical polymerization initiators with thermal activation (thermal initiators). These initiators are composed of compounds which, at a certain temperature, decompose forming free radical species that react with the monomers, starting the polymerization reaction.

By suitably selecting the thermal initiator, the polymerization reaction can be triggered at a certain depth of the reservoir, i.e. in a point of the reservoir in which the activation temperature of the initiator is reached.

The methods for inhibiting or reducing water permeation in extraction wells known in the state of the art have various drawbacks.

In the first place, the effect of the reduction in water permeation has a short duration. This involves frequent interruptions in the extraction activity to allow further injections of treatment fluid into the reservoir with a consequent reduction in the production capacity.

Secondly, the compounds injected according to the methods of the known art have a poor selectivity with respect to the reservoir water. These compounds, in fact, can also interact with irreducible water, also causing a reduction in the mobility of the oil and therefore its extraction yield.

Thirdly, the effects of the application of methods for reducing water permeation in an extraction well are irreversible. Any possible errors in injecting the treatment fluid can therefore cause considerable economic damage (e.g. premature closure of the extraction well).

The methods of the prior art based on the formation of polymers in situ also have the disadvantage of a poor controllability of the polymerization reaction. The polymerization reaction can in fact take place in any point of the reservoir in which there is a temperature sufficient for activating the decomposition of the initiator with the formation of radicals, including the areas of the reservoir in which oil is mainly present instead of water, thus causing a reduction in the mobility of the oil towards the extraction well.

The methods based on the formation of polymers in situ in which is provided the separate injection of monomers and polymerization initiators (or other compounds necessary for triggering the polymerization reaction), also have a limited effectiveness, as only part of the compounds injected in succession actually come into contact with each other, effectively producing polymers.

Considering the above state of the art, the Applicant has set the primary objective of providing a method for effectively inhibiting water permeation in an extraction well of a hydrocarbon oil, so as to reduce interruptions of the extraction activity and increase the productivity of the hydrocarbon oil.

Within the scope of this aim, an objective of the present invention is to provide a method for inhibiting, or at least reducing, water permeation in an extraction well of a hydrocarbon fluid which allows the quantity of water extracted to be reduced, thus attenuating the disadvantages associated with the separation activities of the water from the oil and disposal of the water contaminated by hydrocarbons.

A second objective of the present invention is to provide a method for inhibiting water permeation in an extraction well of a hydrocarbon oil which can be effectively used in reservoirs characterized by rock formations having different geological features.

The Applicant has now found that these and other objectives, that are better illustrated in the following description, can be achieved by a method for inhibiting water permeation in an extraction well of a hydrocarbon oil from an underground reservoir which comprises injecting into said reservoir, at least one polymerizable composition comprising:
at least one hydrophilic monomer,
at least one hydrophilic initiator of radical polymerization with thermal activation (hydrophilic initiator),
at least one lipophilic initiator of radical polymerization with thermal activation (lipophilic initiator).

According to a second aspect, the present invention relates to a liquid polymerizable composition comprising:
at least one hydrophilic monomer,
at least one hydrophilic initiator of radical polymerization with thermal activation,
at least one lipophilic initiator of radical polymerization with thermal activation.

The method according to the present invention allows the extraction efficiency of a hydrocarbon oil from an underground reservoir to be increased.

The above method is based on the injection into the reservoir of a polymerizable composition containing one or more hydrophilic monomers capable of forming a polymer capable of modifying the water permeability of the rock formation of the reservoir, so as to prevent or delay water permeation in the extraction well.

The formation of the polymer takes place in situ, i.e. inside the rock formation of the reservoir after the injection of the polymerizable composition. The polymer formed occupies the empty spaces of the porous system or rock formation fractures, blocking access to reservoir water.

The polymerizable composition comprises at least two thermally activated radical polymerization initiators, which trigger the polymerization reaction of the monomers once the polymerizable composition has reached the areas of the reservoir having a temperature at least equal to the activation temperature of the initiators.

The use of hydrophilic monomers combined with at least one hydrophilic polymerization initiator and at least one lipophilic polymerization initiator allows the formation of the polymer to be selectively obtained only or primarily in the areas of the reservoir in which water is present, leaving, on the contrary, the areas in which oil is present, substantially unchanged.

The lipophilic initiator and hydrophilic initiator are in fact present in the polymerizable composition in an overall concentration which is sufficient for allowing the polymerization of the monomers (hereinafter also indicated as "activation concentration"), once the polymerizable composition has reached the areas of the reservoir having a temperature at least equal to the activation temperature of both of the initiators.

When the polymerizable composition comes into contact with the oil in its path within the reservoir, however, the lipophilic initiator tends to migrate towards the oil, causing the total concentration of the initiators in the polymerizable composition to fall below the activation concentration. Under these conditions, the polymerizable composition is not capable of polymerizing. In the presence of oil, in fact, the hydrophilic monomer remains substantially in the polymerizable composition or possibly migrates towards the reservoir water, if present, together with the hydrophilic initiator. As the concentration of the hydrophilic initiator is below the activation concentration, however, the polymerization does not take place even if the temperature of the polymerizable composition is equal to or higher than the activation temperature of the initiators.

When the polymerizable composition does not encounter oil areas in its path inside the reservoir, it can reach the areas of the reservoir where water is present, unaltered, thus triggering the polymerization reaction, provided that the temperature of these areas is equal to or higher than the activation temperature of the initiators.

When the polymerizable composition reaches areas of the reservoir without oil and water, but having a temperature the same as or higher than the activation temperature of the initiators, the formation of the polymer can take place with a consequent clogging of the porous system or fractures of the rock formation concerned. The formation of the polymer, however, evidently does not have substantial negative consequences on the production capacity of the extraction well.

In a preferred embodiment of the present invention, the polymer which is formed in situ starting from the polymerizable composition is a polymer having a high affinity for water, although being insoluble in the same, such as, for example, a hydrogel. Once formed, the hydrogel is capable of interacting with the reservoir water with which it comes into contact, increasing its viscosity and therefore blocking it inside the rock formation. The particles of hydrogel absorbing the water, moreover, can interact with each other, binding themselves to each other and forming a relatively consistent layer which acts as a barrier to the passage of further water.

The method of the invention can be applied to rock formations having different geological characteristics. In particular, the method is suitable for reducing the mobility of water in both fractured rock formations and in porous rock formations.

The method of the invention is also well suited for being used in reservoirs having different geological characteristics, in particular different temperature profiles, i.e. reservoirs in which different temperature variations can be observed in relation to the depth of the reservoir. The action of the polymerizable composition, in fact, can be regulated according to the temperature of the reservoir layer to which the polymerization reaction is to take place, by suitably varying the chemical composition of the polymerizable composition, in particular by appropriately selecting the hydrophilic and lipophilic initiators on the basis of their decomposition kinetics (activity).

In general, once the temperature profile of a reservoir has been determined, selecting the initiators according to their activation temperature, the method of the present invention can be applied for selectively modifying the water permeability characteristics at a predetermined depth or in a predetermined area of the reservoir.

As already specified, the polymerizable composition injected into the reservoir comprises at least one hydrophilic monomer, at least one hydrophilic initiator of radical polymerization with thermal activation (hydrophilic initiator), and at least one lipophilic initiator of radical polymerization with thermal activation (lipophilic initiator).

The monomers that can be used for the purposes of the present invention are molecules capable of forming polymers through radical polymerization reactions. The monomers are hydrophilic, i.e. monomers soluble or easily dispersible in water. In particular, the hydrophilic monomers that can be used for the purposes of the present invention have a degree of affinity for water which is such that, when the polymerizable composition comes into contact with the reservoir oil, they do not substantially migrate into the oil, but predominantly remain in the polymerizable composition or possibly pass into the reservoir water.

In a preferred embodiment of the present invention, said hydrophilic monomers have a solubility in water equal to or higher than 5 g/L, more preferably higher than or equal to 10 g/L and until complete miscibility with water.

The polymerizable composition according to the present invention can also contain two or more different monomers (comonomers). In this case, the polymerization reaction leads to the formation of copolymers.

Examples of preferred hydrophilic monomers that can be used for the purposes of the present invention are the following: acrylic monomer, methacrylic monomer, monomer comprising at least one ethylenic unsaturation and at least one polyoxoethylene chain.

In particular, specific examples of hydrophilic monomers that can be used for the purposes of the present invention are: acrilamide, sodium acrylate, sodium methacrylate, 2-propylacrylic acid, 2-ethylacrylic acid, 2-trifluoromethylacrylic acid, 2-bromoacrylic acid, 2-aminoethylacrylate, 2-aminoethylmethacrylate, polyethyleneglycol-methacrylates and polyethyleneglycol-acrylates.

In a preferred embodiment, the polymerizable composition comprises monomers capable of forming a hydrogel.

Hydrogels are three-dimensional polymeric structures capable of absorbing considerable quantities of water (for example from 10 to 100 times the dry weight of the polymeric structure). Hydrogels can be homopolymers or copolymers.

Hydrogels can be obtained, for example, by the polymerization of acrylates (e.g. acrylic acid), methacrylates ((e.g. 2-hydroxyethyl methacrylate), acrylamides and methacrylamides (e.g. acrylamide, N-methylacrylamide, N-methylmethacrylamide, N,N-dimethylacrylamide) and cyclic lactams (e.g. N-vinyl pyrrolidone).

Considering that reservoir water can have a high salinity, the hydrogel is preferably capable of also absorbing saline water, i.e. water with a salt content expressed in equivalents of NaCl ranging from 1 g/l to 300 g/l.

The Applicant has found that hydrogels particularly suitable for the purposes of the present invention are copolymers that can be obtained by the polymerization of at least a first acrylic monomer (main monomer) with at least a second monomer comprising at least one ethylenic unsaturation and at least one polyoxoethylene chain (comonomer).

These hydrogels have a high water absorption capacity and are stable under the temperature and salinity conditions of water typical of an oil reservoir (e.g. temperature within the range of 50-120° C.). In particular, once these hydrogels have absorbed the water, they can resist prolonged contact with water having a high saline content, without undergoing a significant structural degradation.

Preferred hydrogels according to the present invention are obtained by the polymerization of at least a first monomer (main monomer) comprising at least one acrylic or methacrylic functional group and a second monomer (comonomer) comprising at least one ethylenic unsaturation and at least one polyoxoethylene chain.

The main monomer is preferably selected from acrylic acid and methacrylic acid.

Preferably, the acid carboxylic groups of the acrylic or methacrylic acid are at least partially neutralized, for example with metal ions, such as alkaline and alkaline earth metal ions or transition metal ions.

Preferably, the quantity of carboxylic groups of the neutralized acrylic or methacrylic acid (salification degree) is equal to 30%-100% of the carboxylic groups of the starting acid, more preferably equal to 60%-100%, even more preferably equal to 70%-100%.

The comonomer comprises at least one ethylenic unsaturation and at least one polyoxoethylene chain.

A preferred example of comonomer is the compound having the following formula (I)

$$CH_2=CR_1-CO-X-(CH_2CH_2O)_nR_2 \qquad (I)$$

wherein:
$R_1$ is H or $CH_3$;
$R_2$ is selected from H, OH, $C_1$-$C_4$ alkyl, $C_1$-$C_4$ alkoxy, or an acrylate group $COCR_3=CH_2$ wherein $R_3$ is H or $CH_3$;

X is O or NH;

n is an integer within the range of 1-500, preferably within the range of 1-200, even more preferably within the range of 4-100.

In a preferred embodiment, in the above formula (I), X is an oxygen atom, the comonomer thus being an acrylic monomer.

In a further preferred embodiment, in the above formula (I), X is an NH group, the comonomer thus being an acrylamide monomer.

In a particularly preferred embodiment, the monomer having formula (I) has only one ethylenic unsaturation, i.e. in the monomer having formula (I), $R_1$ is $CH_3$, $R_2$ is selected from H, OH, $C_1$-$C_4$ alkyl or $C_1$-$C_4$ alkoxy, X is O or NH and n is an integer within the range of 1-50.

The group of monomers having general formula (I) wherein X represents 0 and $R_1$ represents $CH_3$ is also known in the art with the name 2-hydroxyethyl methacrylate-PEG (HEMA-PEG).

In another preferred embodiment, the comonomer having formula (I) is a difunctional monomer and comprises at least two ethylenic unsaturations.

The comonomer preferably has a molecular weight within the range of 200 Da-10,000 Da, more preferably within the range of 500 Da-5,000 Da, even more preferably within the range of 1,000 Da-4,000 Da.

In the present description, the molecular weights of the polymers are expressed as average weight value (Mw), as can be determined, for example, by means of gel permeation chromatography (GPC).

The ratio between the weight of the comonomer and the weight of the main monomer is preferably within the range of 5%-50%, preferably within the range of 10%-350, even more preferably within the range of 20%-300.

The polymerizable composition according to the present invention comprises at least one hydrophilic initiator of radical polymerization with thermal activation and at least one lipophilic initiator of radical polymerization with thermal activation.

For the purposes of the present invention, the initiator is hydrophilic if its distribution coefficient between water and 1-octanol is less than zero.

For the purposes of the present invention, the initiator is lipophilic if its distribution coefficient between water and 1-octanol is greater than zero.

The hydrophilic initiator and lipophilic initiator can be selected according to their activity, i.e. the capacity of providing, under certain temperature conditions, a quantity of free radicals sufficient for triggering and continuing the polymerization reaction of the hydrophilic monomers until the formation of the polymer.

The activity of the initiator in the polymerizable composition mainly depends on the decomposition rate of the initiator itself at a certain temperature, on the chemical composition of the hydrophilic monomers and on that of the possible liquid carrier, for example, water, in which monomers and initiators are dispersed or dissolved.

An index of the activity of an initiator is its half-life time ($t_{1/2}$), i.e. the time necessary for the initial concentration of an initiator solution to be reduced by 50% at a given temperature. The relation between the half-life time of an initiator and the temperature can be expressed for example by means of the temperature at which the initiator has a half-life equal to 10 hours in a certain solvent ($T_{1/2}(10 h)$).

The hydrophilic initiators that can be used for the purposes of the present invention preferably have a temperature $T_{1/2}(10 h)$ in water within the range of 50-150° C. The $T_{1/2}(10 h)$ is preferably equal to or higher than 60° C., more preferably equal to or higher than 70° C. The $T_{1/2}(10 h)$ is preferably equal to or lower than 130° C., more preferably equal to or lower than 120° C.

The lipophilic initiators that can be used for the purposes of the present invention preferably have a temperature $T_{1/2}(10 h)$ in benzene within the range of 50-150° C. The $T_{1/2}(10 h)$ is preferably equal to or higher than 60° C., more preferably equal to or higher than 70° C. The $T_{1/2}(10 h)$ is preferably equal to or lower than 130° C., more preferably equal to or lower than 120° C.

When the formation of polymers is to be obtained at the depth of the well bottom, where the temperature of the reservoir is generally within the range of 70-100° C., the hydrophilic initiator preferably has a temperature $T_{1/2}(10 h)$ in water within the range of 60-100° C. and the lipophilic initiator has a temperature $T_{1/2}(10 h)$ in benzene within the range of 60-100° C.

For the purposes of the present invention, the hydrophilic and lipophilic initiators with thermal activation can be selected from radical polymerization initiators known in the art and having hydrophilic or lipophilic characteristics as defined above.

Examples of preferred hydrophilic initiators are indicated hereunder with the respective temperatures $T_{1/2}(10 h)$ in water and distribution coefficients (Log $P_{octanol/water}$):
1) 2,2'-Azobis[2-(2-imidazolin-2-yl)propane]dihydrochloride (VA-044)–$T_{1/2}(10 h)$=44° C., Log P<0;
2) 2,2'-Azobis[2-(2-imidazolin-2-yl)propane]disulfate dihydrate (VA-046B)–$T_{1/2}(10 h)$=47° C., Log P<0;
3) 2,2'-Azobis(2-methylpropionamidine)dihydrochloride (V50)–$T_{1/2}(10 h)$=56° C., Log P<0;
4) 2,2'-Azobis[N-(2-carboxyethyl)-2-methylpropionamidine]tetrahydrate (VA-057)–$T_{1/2}(10 h)$=57° C., Log P<0;
5) 2,2'-Azobis{2-[1-(2-hydroxyethyl)-2-imidazolin yl]propane}-dihydrochloride (VA-060)–$T_{1/2}(10 h)$=60° C., Log P<0;
6) 2,2'-Azobis[2-(2-imidazolin-2-yl)propane] (VA-061)–$T_{1/2}(10 h)$=61° C., Log P<0;
7) 2,2'-Azobis(1-imino-1-pyrrolidine-2-ethylpropane)-dihydrochloride (VA-067)–$T_{1/2}(10 h)$=67° C., Log P<0;
8) 2,2'-Azobis{2-methyl-N-[1,1-bis(hydroxymethyl)-2-hydroxyethyl]propionamide} (VA080)–$T_{1/2}(10 h)$=80° C., Log P<0;
9) 2,2'-Azobis[2-methyl-N-(2-hydroxyethyl)propionamide] (VA086)–$T_{1/2}(10 h)$=87° C., Log P<0; 10) ammonium persulfate–$T_{1/2}(10 h)$=65° C., Log P<<0;
11) sodium persulfate–$T_{1/2}(10 h)$=65° C., Log P<<0; 12) potassium persulfate–$T_{1/2}(10 h)$=65° C., Log P<<0;
13) hydroxymethanesulfonic acid monosodium salt dihydrate–$T_{1/2}(10 h)$=60° C., Log P<<0;
14) 4,4'-Azobis(4-cyanovaleric acid)–$T_{1/2}(10 h)$=50° C., Log P<0;
15) granular 2,2'-Azobis(2-methylpropionamidine) dihydrochloride–$T_{1/2}(10 h)$=55° C., Log P<0.

Examples of preferred lipophilic initiators are indicated hereunder with the respective temperatures $T_{1/2}(10 h)$ in benzene and distribution coefficients (Log $P_{octanol/water}$):
1) benzoyl peroxide–$T_{1/2}(10 h)$=65° C., Log P>0;
2) 2,2'-Azobis(4-methoxy-2,4-dimethyl valeronitrile) (V-70)–$T_{1/2}(10 h)$=30° C., Log P>0;
3) 2,2'-Azobis(2,4-dimethyl valeronitrile) (V-65)–$T_{1/2}(10 h)$=51° C., Log P>0;
4) dimethyl-2,2'-azobis(2-methylpropionate) (V-601) $T_{1/2}(10 h)$=66° C., Log P>>0;
5) 2,2'-azobis(2-methylbutyronitrile) (V-59) $T_{1/2}(10 h)$=67° C., Log P>>0;

6) 1,1'-azobis(cyclohexane-1-carbonitrile) (V40) $T_{1/2}$(10 h)=88° C., Log P>0;
7) 2,2'-azobis[N-(2-propenyl)-2-methylpropionamide] (VF-096)–$T_{1/2}$(10 h)=96° C., Log P>0;
8) 1-[(1-cyano-1-methylethyl)azo]formamide (V-30) $T_{1/2}$ (10 h)=104° C., Log P>>0;
9) 2,2'-azobis(N-butyl-2-methylpropionamide) (VAm-110)–$T_{1/2}$ (10 h)=110° C., Log P>>0;
10) 2,2'-azobis(N-cyclohexyl-2-methylpropionamide) (VAm-111)–$T_{1/2}$(10 h)=111° C., Log P>>0;
11) dicumyl peroxide–$T_{1/2}$(10 h)=75° C., Log P>0;
12) tert-butyl peroxide–$T_{1/2}$(10 h)=70° C., Log P>0;
13) tert-butyl peroxybenzoate–$T_{1/2}$(10 h)=73° C., Log P>>0;
14) lauroyl peroxide–$T_{1/2}$(10 h)=75° C., Log P>0

The choice of the hydrophilic and lipophilic initiator can also take into account the desired lag time for the polymerizable composition, i.e. the time necessary for the polymerization reaction to be triggered in the polymerization composition under certain concentration conditions of the initiators and temperature of the polymerizable composition.

The polymerizable composition according to the present invention can therefore be advantageously formulated with a lag time which is such as to allow its injection into the reservoir and allow the desired depth to be reached (for example, the well bottom or an intermediate layer of the reservoir whose water permeability is to be reduced), without the polymerization reaction substantially taking place in the meantime.

According to a preferred aspect of the present invention, the lag time of the polymerizable composition is within the range of 5-72 hours. The lag time is preferably equal to or more than 8 hours, more preferably equal to or more than 16 hours. The lag time is preferably equal to or less than 60 hours, more preferably equal to or less than 48 hours.

The lag time of the polymerizable composition also depends on the total concentration of the hydrophilic initiator and lipophilic initiator. As already indicated, the total concentration of the two above-mentioned initiators is equal to or higher than a certain threshold concentration (activation concentration). Below this threshold concentration, the polymerization reaction of the monomers takes place, for a certain temperature, at a rate which is insufficient for being able to be exploited for practical purposes to form polymers within the rock formation of a reservoir.

The total concentration of the initiators, i.e. the hydrophilic initiator and the lipophilic initiator, is preferably within the range of 0.006% to 1.00% by weight with respect to the overall weight of the monomers.

The total concentration of the hydrophilic initiator and the lipophilic initiator is more preferably within the range of 0.01% to 0.50% by weight with respect to the overall weight of the monomers.

The lipophilic initiator is preferably present in a total concentration within the range of 0.005% to 0.500% by weight with respect to the total weight of the monomers.

The hydrophilic initiator is preferably present in a total concentration within the range of 0.001% to 0.100% by weight with respect to the total weight of the monomers.

According to a preferred aspect of the present invention, the weight ratio between the hydrophilic initiator and the lipophilic initiator present in the polymerizable composition is within the range of 95:5 to 5:95, preferably within the range of 60:40 to 5:95, more preferably within the range of 50:50 to 10:90.

According to a preferred aspect of the present invention, the polymerizable composition can comprise a liquid carrier.

The function of the liquid carrier is to convey the ingredients of the polymerizable composition within the reservoir formation, so as to allow its components to reach the areas to be treated, in particular the areas in which reservoir water is present. The polymerizable composition advantageously comprises a liquid carrier when it does not contain ingredients in the liquid state, which can exert the function of liquid carrier. If the polymerizable composition comprises, for example, liquid hydrophilic monomers, the use of an additional liquid carrier can be avoided.

The liquid carrier is preferably water or another solvent in which the hydrophilic monomer can be easily dispersed or dissolved. The liquid carrier must also be sufficiently hydrophilic to keep the hydrophilic monomer of the polymerizable composition dissolved or dispersed.

Examples of solvents that can be used for the purposes of the present invention as liquid carriers are: water, tetrahydrofuran (THF), ethanol, and acetone.

When present, the liquid carrier is in a quantity within the range of 20-70% by weight with respect to the total weight of the hydrophilic monomers.

The polymerizable composition can also contain one or more crosslinking agents in order to obtain crosslinked polymers. The crosslinking agents are preferably included in the polymerizable compositions when hydrogels are to be formed in situ.

The formation of crosslinked polymers, moreover, is preferable if the method of the present invention is used for reducing the water permeation of fractured rock formations, as it allows the polymers formed in situ to clog the fractures more effectively and stably, thus exerting a better water containment action.

Furthermore, crosslinked polymers have a higher structural resistance under the conditions of use in the reservoir with respect to non-crosslinked polymers.

The crosslinking agents can be selected from compounds capable of crosslinking the monomers selected for the preparation of the polymer. Examples of crosslinking agents, particularly preferred in the case of hydrogel polymers, are: N,N'-methylene-bis-acrylamide, ethyleneglycol-dimethacrylate, divinylbenzene, poly(ethyleneglycol)diacrylate, 1,4-butandiol diacrylate, trimethyl-propane triacrylate, 1,4-bis(4-vinylphenoxy)butane, bis(2-methacryloyl)-oxyethyl disulfide.

The crosslinking degree of the polymer can be varied, by regulating the concentration of crosslinking agent in the polymerizable composition.

The ratio between the weight of the crosslinking agent and the total weight of the monomers of the polymerizable composition is preferably within the range of 0.2%-2%, more preferably within the range of 0.50-0.9%.

The polymerizable composition can be prepared according to the techniques and using the devices known to skilled persons in the art.

The polymerizable composition can be prepared, for example, by mixing the monomers, the hydrophilic and lipophilic initiators and the possible optional ingredients, such as liquid carrier (e.g. water), surfactants, crosslinking agents, etc., by means of mechanical stirring (for example, using a static mixer).

The method of the present invention can be applied to rock formations having different geological characteristics. In particular, the method is suitable for reducing the mobility of the water in both fractured rock formations and in porous rock formations.

The polymerizable compositions containing monomeric compounds, in fact, have a low viscosity in themselves, and can therefore be easily injected into the subsoil. The viscosity of the polymerizable composition can also be regulated by adding a liquid carrier (e.g. water) or by varying the quantity of liquid carrier when present.

The method according to the present invention can be applied either before starting the extraction of the hydrocarbon oil from an oil reservoir, or when the well is already in production, i.e. when the exploitation has already been started.

In particular, the method can be advantageously applied to so-called "mature" extraction wells, i.e. wells that have reached the production capacity limit, and are characterized by the extraction of significant quantities of water combined with the hydrocarbon oil.

The injection of the polymerizable composition into a reservoir can be effected with the equipment and according to the techniques known in the field of the oil extraction industry.

The injection of the polymerizable composition into the reservoir can be effected either through the extraction well of the hydrocarbon fluid or through the other wells generally present in an oil field, such as wells for the injection into the subsoil of vapour, water or other fluids (so-called injector wells).

The method according to the present invention can therefore be used in secondary and tertiary activities of recovering a hydrocarbon oil, in both water shut-off treatment and in rock formation treatment (conformation treatment).

The quantities of polymerizable composition to be injected can vary widely in relation to the specific geological conformation of the reservoir.

The quantity of polymerizable composition can be easily determined by skilled persons in the art on the basis of the geological characteristics of the reservoir, in particular its temperature profile, and simple routine experimental tests.

The injection of the polymerizable composition can be possibly followed by the injection of a displacement fluid (for example, the same liquid carrier, of the polymerizable composition, if present), so as to favour the penetration of the polymerizable composition in the rock formation of the reservoir.

At the end of the injection of the polymerizable composition and possibly of the displacement fluid, the extraction of the hydrocarbon fluid from the well can be started or resumed. Before proceeding with the extraction of the hydrocarbon fluid, a period of time is preferably allowed to pass, which is sufficient for allowing the polymerizable composition to come into contact with the reservoir water and react, forming polymers in situ, obtaining the desired reduction effect of the mobility of the water.

If necessary, the extraction of the hydrocarbon fluid can be interrupted for effecting further injections of treatment fluid, so as to obtain an additional increase in the productivity of the extraction well.

If the polymers formed in situ are hydrogels as previously described, the effects of the injection of a polymerizable composition according to the present invention are advantageously at least partially reversible. The water absorbed by the hydrogels can in fact be re-expelled from the polymers by contact of the hydrogels with an acid compound. The acid compound, such as a mineral acid (e.g. hydrochloric acid) or an organic acid (e.g. formic acid), can be injected into the reservoir with the same procedure described for the treatment fluid.

This property of hydrogels can be exploited in order to at least partially correct any injection errors of the polymers into the reservoir, if, for example, the injections of polymer cause a worsening of the oil production capacity.

The following embodiment examples are provided for purely illustrative purposes of the present invention and should not be considered as limiting the protection scope defined by the enclosed claims.

EXAMPLES

Preparation of the Polymerizable Compositions

Polymerizable compositions according to the present invention were prepared using the following ingredients:

a) a mixture of hydrophilic monomers composed of methacrylic acid (AMA), as main monomer, and 2-hydroxyethyl methacrylate-PEG (HEMA-PEG), as comonomer (molecular weight (Mw) of HEMA-PEG about 2000 Da; average value of n in general formula (I) equal to 45; salification degree of HEMA-PEG equal to about 100%);

b) 4,4'-azobis(4-cyanovaleric acid) as hydrophilic polymerization initiator;

c) benzoyl peroxide as lipophilic polymerization initiator;

d) bisacrylamide as crosslinking agent.

The relative quantities of main monomer and comonomer with respect to the total weight of the mixture of hydrophilic monomers are: 75% AMA, 25% HEMA-PEG.

The polymerizable compositions were prepared by first mixing the monomer and comonomer together, and subsequently adding the hydrophilic and lipophilic initiators and crosslinking agent to the resulting mixture.

Polymerization Tests

In order to verify the behaviour of the polymerizable compositions under conditions close to those of the reservoir, each composition was subjected to two separate polymerization reactions, respectively in the presence of:

(i) saline water (distilled water containing $Na^+$ (34 g/l), $Ca^{++}$ (5.8 g/l), $Mg^{++}$ (0.6 g/l)) ions;

(ii) water/oil mixture (dispersion) at 50% by weight.

The tests were carried out by pouring the polymerizable composition into a test-tube containing saline water or a water/oil mixture kept at a temperature of 85° C.

The tests in water showed the capacity of the polymerizable compositions according to the present invention of polymerizing until the formation of a hydrogel.

During the tests in water, the time was also measured, during which the composition polymerizes forming the hydrogel (gelation time).

The tests in a water/oil mixture, on the other hand, showed that the polymerizable compositions do not substantially form hydrogels in contact with an oil.

The chemical composition of the polymerizable compositions and the results of the tests are indicated in Table 1 below.

TABLE 1

| Composition nr. | Mixture hydrophilic monomers AMA/HEMA-PEG[1] | Crosslinking agent[2] | Total concentration initiators[2] | Ratio Lip In./Hydr. In[3] | Gelation time in water | Formation of hydrogel in water/oil mixture |
|---|---|---|---|---|---|---|
| S46 | 75/25 | 0.35 | 0.05 | 90/10 | 5 hrs 16 min | NO |
| S50 | 75/25 | 0.35 | 0.025 | 70/30 | >8 hours | NO |
| S51 | 75/25 | 0.35 | 0.025 | 60/40 | >8 hours | NO |

[1] AMA/HEMA-PEG weight ratio in the mixture of hydrophilic monomers
[2] weight percentage with respect to the weight of the mixture of hydrophilic monomers
[3] lipophilic initiator (Lip. In.)/hydrophilic initiator (Hydr. In.) weight ratio The tests effected showed that the polymerizable compositions according to the present invention selectively polymerize in the presence of water, whereas they are inactive in the presence of oil.

The invention claimed is:

1. A polymerizable composition for injection into an underground reservoir of hydrocarbon oil, said composition comprising:
    at least a first monomer selected from an acrylic monomer or a methacrylic monomer; and
    at least a second monomer comprising at least one ethylene unsaturation and at least one polyoxoethylene chain;
    at least one hydrophilic initiator of radical polymerization with thermal activation (hydrophilic initiator) having a temperature $T_{1/2}$ (10 h) in water within the range of 50-150° C.,
    at least one lipophilic initiator of radical polymerization with thermal activation (lipophilic polymerization initiator) having a temperature $T_{1/2}$ (10 h) in benzene within the range of 50-150° C.,
    said composition being capable apt to form polymers in situ in contact with reservoir water,
    wherein the initiator is hydrophilic if its distribution coefficient between water and 1-octanol is less than zero, and
    the initiator is lipophilic if its distribution coefficient between water and 1-octanol is greater than zero.

2. The polymerizable composition according to claim 1 wherein the total concentration of said at least one hydrophilic initiator and said at least one lipophilic initiator is within the range of 0.006-1.00% by weight with respect to the overall weight of said at least one hydrophilic monomer.

3. The polymerizable composition according to claim 1, wherein said at least one lipophilic initiator is present in a concentration within the range of 0.005-0.500% by weight with respect to the overall weight of said at least one hydrophilic monomer.

4. The polymerizable composition according to claim 1, wherein said at least one hydrophilic initiator is present in a concentration within the range of 0.001-0.100% by weight with respect to the overall weight of said at least one hydrophilic monomer.

5. The polymerizable composition according to claim 1, wherein the weight ratio between the hydrophilic initiator and the lipophilic initiator present in the polymerizable composition is within the range of 95:5 to 5:95.

6. The polymerizable composition according to claim 1, wherein said polymerizable composition comprises at least one crosslinking compound.

7. The polymerizable composition according to claim 6, wherein the at least one crosslinking compound is selected from the group consisting of N,N'-methylene-bis-acrylamide, ethyleneglycol-dimethacrylate, divinylbenzene, poly(ethyleneglycol)diacrylate, 1,4-butandiol diacrylate, trimethyl-propane triacrylate, 1,4-bis(4-vinylphenoxy)butane and bis(2-methacryloyl)-oxyethyl disulfide.

8. The polymerizable composition according to claim 1, wherein said polymerizable composition comprises at least one surfactant.

9. The polymerizable composition according to claim 1, wherein said polymerizable composition polymerizes forming a hydrogel.

10. The polymerizable composition according to claim 1, wherein said second monomer has the following formula (I)

$$CH_2=CR_1-CO-X-(CH_2CH_2O)_nR_2 \qquad (I)$$

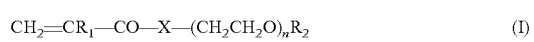

wherein:
    $R_1$ is H or $CH_3$;
    $R_2$ is H, OH, $C_1$-$C_4$ alkyl, $C_1$-$C_4$ alkoxy, or an acrylate group $COCR_3=CH_2$ wherein $R_3$ is H or $CH_3$,
    X is O or NH;
    n is an integer within the range of 1-500.

11. The polymerizable composition according to claim 1, wherein said first monomer is selected from acrylic acid and methacrylic acid.

12. The polymerizable composition according to claim 1, further including a liquid carrier.

13. The polymerizable composition according to claim 12, wherein the liquid carrier is selected from the group consisting of water, tetrahydrofuran (THF), ethanol, and acetone.

14. The polymerizable composition according to claim 12, wherein the liquid carrier is in a quantity within the range of 20-70% by weight with respect to the total weight of the hydrophilic monomers.

15. The polymerizable composition according to claim 13, wherein the liquid carrier is in a quantity within the range of 20-70% by weight with respect to the total weight of the hydrophilic monomers.

* * * * *